United States Patent Office 3,711,447
Patented Jan. 16, 1973

3,711,447
FIBER-FORMING POLYAMIDES WITH AN INCREASED CONTENT OF AMINO GROUPS PREPARED BY USING A PARTLY LINEAR ALIPHATIC, PARTLY CYCLOALIPHATIC POLYAMINE AS A MODIFIER
Walter Fester, Konigstein, Taunus, Ernst Hanschke, Burghausen, and Franz Jakob, Hofheim, Taunus, Germany, assignors to Farbwerke Hoechst Aktiengesellschaft vormals Meister Lucius & Bruning, Frankfurt am Main, Germany
No Drawing. Filed Aug. 19, 1970, Ser. No. 65,300
Claims priority, application Germany, Aug. 26, 1969,
P 19 43 251.0
Int. Cl. C08g 20/20
U.S. Cl. 260—78 TF   12 Claims

ABSTRACT OF THE DISCLOSURE

Novel film and fiber-forming modified polyamides with an increased content of amino groups are obtained, if in the preparation of polyamides from the common starting compounds polyamines are added which have partly linear aliphatic, and partly cyclo-aliphatic and, optionally, aromatic structural units in the molecule—optionally, in admixture with polyamines having partly aromatic, and partly cyclo-aliphatic structural units in the molecule, and/or cyclo-aliphatic polyamines which may also have 1 aliphatic C-atom each between the cycloaliphatic rings and the amino groups.

---

The present invention relates to fiber-forming polyamides with an increased content of amino groups, and to a process for making them.

Polyamides from amino-carboxylic acids and their derivatives, for example lactams, such as ε-caprolactam, or from diamines and dicarboxylic acids, such as polyhexamethylene diammonium adipate, have besides acid end groups also basic end groups, which consist for the most part of amino groups.

These amino groups are important for the affinity of the polyamide for acid dyestuffs. It is, therefore, desirable that polyamides or the fibers and filaments manufactured thereof, which are to be dyed with acid dyestuffs, should have a content of amino groups which is as high as possible. The number of basic groups in an unmodified polyamide is limited, due to its high molecular weight, since only the end groups of the polymer consist of amino or carboxyl groups. Thus, for example, an unmodified polyamide 6 contains, as a rule, of from 40 to 50 milliequivalent of $NH_2$-groups per kilogram, depending on the process of preparation and its molecular weight.

It is known that the number of alkaline groups can be increased by adding amines, such as hexamethylene diamine, diethylene triamine, polyethylene imine, or xylylene diamine, to the polycondensation mixture or the polycondensate.

However, the whiteness of these products does not meet the requirements which are normally demanded from a raw material for fibers. In particular, if amines having aromatic groups are used as modification agents, only products showing a discoloration are obtained. Moreover, if these amines are used for modification, sufficiently high molecular weights of the corresponding polyamides cannot be obtained.

With a modification of this kind, both an improvement of the whiteness and an increase of the molecular weight can be obtained by adding phosphorus compounds, such as phosphoric acid or its esters. However, the addition of phosphoric acid, in particular, may be a drawback, if $TiO_2$ is to be added to the polyamide as dulling agent, since the phosphoric acid and the amine salt which is formed lead to a coagulation of the $TiO_2$ suspension introduced, which results in considerable difficulties in spinning.

In Canadian Pat. No. 837,201 it has been proposed to use, as modification component for the preparation of polyamides with an increased content of amino groups and an excellent whiteness, as least one aliphatic polyamine (which may also have 1 aliphatic C-atom each between the cyclo-aliphatic rings and the amino groups) of the general formulas

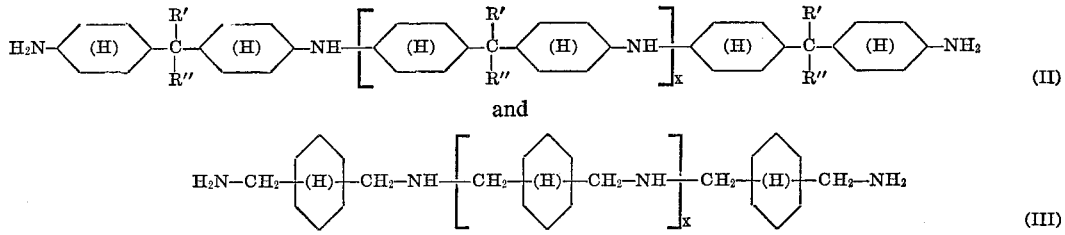

(II)

and (III)

in which x represent 0 or a whole number of from 1 to 30, preferably from 0 to 10,
R' represents H, —$CH_3$, —$C_2H_5$, and
R" represents H, —$CH_3$, —$C_2H_5$;
the linkages of the rings in Formula III are preferably meta- and para-linkages (=1.3- and 1.4-linkages).

Moreover, it has been proposed in U.S. patent application Ser. No. 65,299 filed concurrently herewith and entitled: "Fiber-Forming Polyamides With an Increased Content of Amino Groups" to use, for the modification of polyamides, polyamines having partly aromatic, and partly cyclo-aliphatic structural units in the molecule, optionally, in admixture with at least one cyclo-aliphatic polyamine, which may also have 1 aliphatic C-atom each between the cyclo-aliphatic rings and the amino groups, preferably at least one polyamine of Formulas II and III; these polyamines having partly aromatic, and partly cyclo-aliphatic structural units in the molecule are preferably those having the general formula

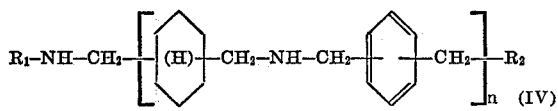

in which $n$ represents a whole number of from 1 to 10, preferably from 1 to 3,
$R_1$ represents H or

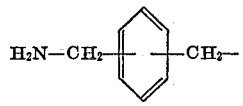

$R_2$ represents $NH_2$ or

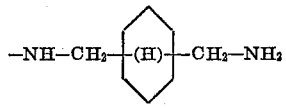

and the linkages of the rings are preferably meta- and para-linkages.

Surprisingly, it has been found that products of an excellent degree of whiteness are obtained, if as modification agents for the preparation of film and fiber-forming modified polyamides with an increased content of amino groups, polyamines are used which have partly linear aliphatic, and partly cyclo-aliphatic and, optionally, aromatic structural units in the molecule, possibly in admixture with polyamines with partly aromatic, and partly cyclo-aliphatic structural units in the molecule and/or cyclo-aliphatic polyamines (where there may also be 1 aliphatic C-atom each between the aromatic and/or cyclo-aliphatic ring and the amino group).

This result is particularly surprising, as polyamides modified by the corresponding linear aliphatic amines show a strong yellow discoloration when heated to elevated temperatures; it is only by incorporation of cyclo-aliphatic rings into the linear aliphatic polyamines, that the thermal stability of the polyamides modified by them can be considerably improved. There is no stabilizing effect of the cyclo-aliphatic components, if cyclo-aliphatic polyamines are mixed with purely linear aliphatic polyamines, and the mixture is used for the modification of polyamides. This stabilizing effect of cyclo-aliphatic ring systems is a new finding and has never been described before in this form.

It is advantageous to use those polyamines having partly linear aliphatic, and partly cyclo-aliphatic and, optionally, aromatic structural units in the molecule, which correspond to the following general formula:

(I)

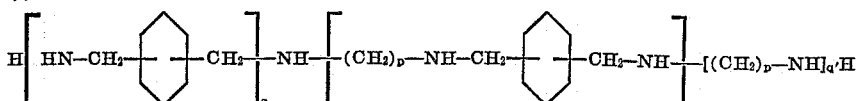

in which $p$ represents a whole number of from 1 to 12, preferably from 2 to 4,
$q$ and $q'$ represent 0 or 1,
$m$ represents a whole number of from 1 to 10, preferably from 1 or 2 (if $q$ and $q'$ equal 0) to 4, the linkages of the rings are preferably meta- and para-linkages, and at least half of the rings is cyclo-aliphatic, the rest being aromatic.

Preferred polyamines of this kind are those having exclusively cyclo-aliphatic rings and those having cyclo-aliphatic and aromatic rings in alternating sequence.

As modification agents for film and fiber-forming polyamides there may be used the compounds of Formula I alone or together with at least one aliphatic polyamine, which may also have 1 aliphatic C-atom each between the cyclo-aliphatic rings and the amino groups—preferably at least one of the polyamines of Formulas II and III specified in Canadian Pat. No. 837,201, and/or least one polyamine having partly aromatic, and partly cyclo-aliphatic structural units in the molecule—preferably at least one of the polyamines of Formula IV specified in μ.S. patent application Ser. No. 65,293 filed concurrently herewith and entitled: "Novel Polyamines and Process for Their Preparation." The total amount of modification agents to be used is up to about 10% by weight, preferably from 0.05 to 5% by weight, calculated on the final polymer to be expected.

The preparation of the film and fiber-forming polyamides modified by the above-mentioned modification agents is effected in accordance with methods that are common for the preparation of the basic unmodified polyamide in each case and proceeds from the common polyamide-forming starting substances, to which the modification agents are normally added. As polyamide-forming starting substances there may be cited, for example:

Lactams, in particular those having up to 13 atom rings such as ε-caprolactam and ω-lauryl lactam; the corresponding ω-amino-carboxylic acids, such as ε-amino-caproic acid, or 11-amino-undecanoic acid, diammonium salts of alkylene diamines with aliphatic dicarboxylic acids, for example the corresponding salts of tetra-, hexa-, octa-methylene diamine with glutaric acid, adipic acid, pimelic acid, suberic acid, azelaic acid, and sebacic acid. Naturally, mixtures of the above-mentioned starting substances may also be used. Preferred starting compounds are ε-caprolactam and the corresponding ε-amino-caproic acid, as well as hexamethylene diammonium adipate (AH salt); they serve for the preparation of polyamide 6 or 66 modified accordingly. The modification of the polyamides by polyamines I and/or a mixture of polyamines I with at least one polyamine II, III and/or IV may also be effected by means of a subsequent treatment of the corresponding unmodified polyamides, although this process is less advantageous. For this purpose, the unmodified polyamides, preferably in the form of chips, are, for example, wetted by a solution of the modification polyamine in a solvent that does not act upon the polyamide, such as water, subsequently the solvent is removed so that the polyamine remains in regular distribution on the polyamide chips. By short-time melting of the polyamide chips thus treated, practically the same modified polyamides are obtained as by the addition of the modification agents to the polymerization mixture. A sufficient short-time melting is the melting for the purpose of extrusion of the polyamide melt, or a simple re-extrusion. It goes without saying that, for this treatment, the polyamide must not melt with decomposition.

The polyamines of general Formula I are preferably prepared by using as starting substances hydrogenated and, optionally, non-hydrogenated xylylene diamine and dichloralkanes of the formula $Cl(CH_2)_pCl$ ($p$ representing a whole number of from 1 to 12, preferably from 2 to 4), optionally in the presence of $NH_3$, or by means of desaminating hydrogenation, using as starting substance xylene diamine and a diamine of the formula

in which $p$ has the above meaning, as has been described in U.S. patent application Ser. No. 65,298 filed concurrently herewith and entitled,: "Novel Polyamines and Process for Their Preparation." The preparation of the polyamines is carried out as follows:

A mixture was prepared consisting of 3 moles of a mixture of hexahydroxylylene diamine isomers (1,3- or 1,4-hexahydroxylylene diamine 7:3) and the amount of aqueous sodium hydroxide solution of 40–50% strength calculated on 1 mole of ethylene chloride, the mixture was heated with reflux to about 100° C., while 1 mole of ethylene chloride was dropped in, and was then kept for another hour at about 100° C. Subsequently the water was removed by means of azeotropic distillation with xylene, the residue was freed from NaCl by suction, and xylene as well as the excess of the starting diamine were distilled off in vacuo. The residue, which was practically colorless, had a nitrogen content of 16.9% (theoretical value for the product consisting of 2 moles of hexahydroxylylene diamine and 1 mole of ethylene chloride: 18%), the yield was 98%. The product did not show any discoloration when heated to 260° C.

If, instead of the 3 moles of hexahydroxylylene diamine, a mixture consisting of 1.5 moles of hexahydroxylylene diamine and 1.5 moles of xylylene diamine was used as starting compound for the reaction with ethylene chloride, a thermostable polyamine was also obtained.

The polyamines of Formula II are, for example, prepared as follows:

If in Formula II R' and R" each represent H, 4,4'-diamino-dicyclo-hexyl-methane is used as starting compound, which is heated at 250° C. under a nitrogen atmosphere, in the presence of 1% by weight of Raney nickel, for a prolonged period of time (about 7 hours). The poly-4,4'-diamino-dicyclo-hexyl-methane which is formed represents a mixture of several substances having different polymerization degrees (mainly with $x$ being between 0 and about 10). If R' and R" represents $CH_3$ or $C_2H_5$, analogues corresponding to 4,4'-diamino-dicyclo-hexyl-methane are used as starting compounds. The reaction conditions remain virtually unchanged.

The polyamines of Formulas III and IV are preferably prepared by means of desaminating catalytic hydrogenation, using as starting substance xylylene diamine—i.e. preferably p- or m-xylylene diamine, as well as mixtures of these xylylene diamines, in accordance with the methods described in the aforesaid Canadian patent and U.S. application Ser. No. 65,293 filed concurrently herewith and entitled "Novel Polyamines and Process for Their Preparation." O-xylylene diamine is less suitable; however, small amounts of it may also be used in admixture with p- and/or m-xylylene diamine. What has been said in this place about xylylene diamine as starting compound is also applicable to the xylylene diamine used for the preparation of the polyamines of Formula I.

In case no uniform xylylene diamine isomer is used as starting compound, the linkages of the rings of final products I, III and IV are, naturally, not uniform either, but constitute a mixture of p-, m- and o-linkages.

In the case of the preparation of polyamines III and IV by means of catalytic hydrogenation of xylylene diamine, the hydrogenation product consists generally of a mixture of different polyamines of the Formulas III or IV having a different polymerization degree. This mixture can readily be used as such, or after fractionation by vacuum distillation, for the preparation of modified polyamides in accordance with the present invention.

The polyamides modified according to the invention, as well as the products made thereof, have an excellent degree of whiteness and a rather high molecular weight. The superiority of the polyamides modified in accordance with the invention, over those which have been modified by diethylene triamine and which belong to the prior art, is demonstrated as follows:

The following table shows the differences in whiteness, as well as in the molecular weight—expressed in $\eta_{rel}$ (measured with a solution of 1% strength in sulfuric acid of 96% strength at 25° C.)—with an approximately equal number of amino groups.

TABLE

| Modification of polyamide 6 | Percent of reflectance [1] | Content of NH$_2$ groups (milliequivalent/kg.) [2] | Viscosity, $\eta_{rel}$ |
|---|---|---|---|
| Modified by 0.6% by weight of polyamine I with $p$ being 2, $m$ being 1 | 52 | 100 | 2.8 |
| Modified by 0.3% by weight of diethylene triamine | 33 | 87 | 2.2 |

[1] Measured by means of the photo-electric reflectance photometer Elrepho of Messrs. Zeiss.
[2] Determined by potentiometric titration in m-cresolic solution with N/10 methanolic p-toluene sulfonic acid.

The addition of diethylene triamine leads to a strong discoloration of the polyamide. The same effect is known from the modification by poly-ethylene imine (Pat. No. 5,368 of the Amt für Patent- and Erfindungswesen [Office for Patents and Invention] of the German Democratic Republic).

In comparison with diamines, the polyamines described as modification agents have the advantage that they provide, due to their smaller proportion of primary amino groups, polyamides having a higher molecular weight with the same content of amino groups.

The preparation of polyamides having a higher molecular weight is particularly important for the manufacture of carpet fibers.

If high viscosities are to be obtained with a high percentage of modification agents added, suitable phosphorus compounds can be added to the polymerization mixture for after-condensation, such as phosphoric acid or its organic esters, phosphonic and phosphinic acids or their organic esters, or phosphorous acid, in an amount of, preferably, up to 0.3% by weight, calculated on the total reaction mixture.

The following example serves to illustrate the present invention.

The content of amino groups in the described sample was determined by means of potentiometric titration in m-cresolic solution with N/10 methanolic p-toluene sulfonic acid. All percentages given represent percent by weight.

EXAMPLE 3 kilograms of caprolactam were mixed with 200 milliliters of water and 18 grams of polyamine of the general Formula I with $p$ being 2, $m$ being 1, under a nitrogen atmosphere in an autoclave at 80° C.

Subsequently, the mixture was heated to 180° C., this temperature being maintained for 1 hour. The temperature was then increased to 260° C., and the autoclave pressure was released during 1 hour at this temperature. After normal pressure had been reached, the mixture was after-polymerized for another 4 hours at 280° C.

The polyamide melt obtained was discharged as a cable under nitrogen pressure and was granulated after it had been cooled in water.

In order to remove the residual monomer and the oligomers, the chips were washed three times in de-ionized water for 2 hours each time at 80° C., subsequently they were dried in vacuo for 48 hours at 90° C. This polyamide had a viscosity of $\eta_{rel}$=2.8, measured with a solution of 1% strength in sulfuric acid of 96% strength at 25° C. The content of amino groups was 100 milli-equivalent/kg.

We claim:

1. In a process for the preparation of film and fiber-forming polyamides whereby an increased content of amino-groups are provided, the improvement of which comprises: polycondensing a polyamide precursor selected from the group consisting of a lactam; omega-amino-carboxylic acid corresponding to said lactam; diammonium salts of an alkylene diamine with an aliphatic dicarboxylic acid, or mixtures of said precursors in the presence in an amount from 0.05% to 10% by weight, based on the total amount of the precursor, of at least one polyamine of the general formula (I)
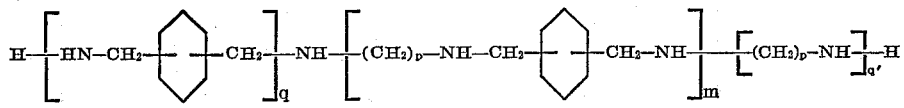

in which
p represents a whole number of from 1 to 12;
q and q' equal 0 or 1;
m represents a whole number of from 1 to 10; the ring moieties are of rings having meta- and para-linkages; and wherein at least half of the defined rings are cycloaliphatic, the rest being aromatic.

2. The process as defined in claim 1 and wherein p is 2 to 4 and m is 1.
3. The process as defined in claim 1 and wherein p is 2 to 4 and m is 2 to 4.
4. In a process for the preparation of film and fiber-forming polyamides whereby an increased content of amino-groups are provided, the improvement of which comprises: polycondensing a polyamide precursor of a lactam; omega-amino-carboxylic acid corresponding to said lactam; diammonium salts of an alkylene diamine with an aliphatic dicarboxylic acid, or mixtures of said precursors in the presence in an amount from 0.05% to 10% by weight, based on the total amount of the precursor, of at least one polyamine of the general formula (I)
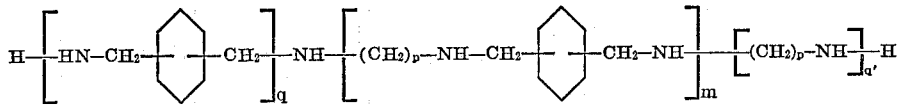

in which
p represents a whole number of from 1 to 12;
q and q' equal 0 or 1;
m represents a whole number of from 1 to 10;
the ring moieties are of rings having meta- and para-linkages;
and wherein at least half of the defined rings are cycloaliphatic, the rest being aromatic, together with at least one polyamine of the general formulae:

(II)
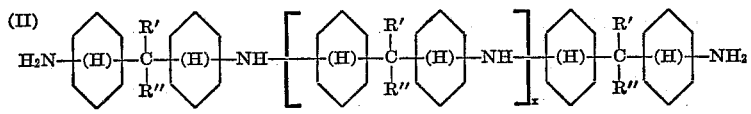

(III)
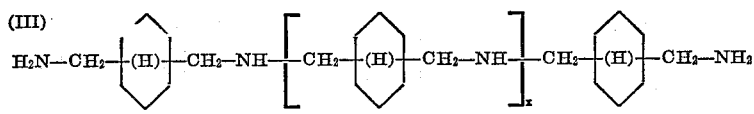

and
(IV)
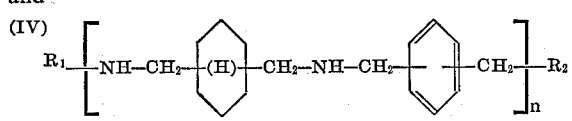

in which Formulas II and III
x represents 0 or a whole number of from 1 to 30;
R' represents H, —CH₃, or —C₂H₅;

R" represents H, —CH₃, or —C₂H₅;
and in Formula IV, n represents a whole number of from 1 to 10;
R₁ represents

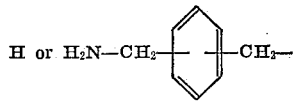

R₂ represents

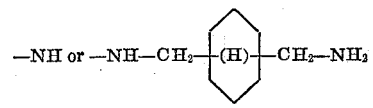

and the linkages of the rings in Formulae III and IV are essentially meta- and para-linkages.

5. The process defined in claim 4 and wherein p is 2 to 4, m is 1, x represents 0 to 10 and n represents 1 to 3.
6. The process defined in claim 4 and wherein p is 2 to 4, m is 2 to 4, x represents 0 to 10 and n represents 1 to 3.
7. A modified polyamide 6 prepared by the process as defined in claim 4 and having incorporated therein from 0.05% to 10% by weight of final polymer in admixture with the polyamine I as defined in claim 4, polyamine II, polyamine III or mixtures of polyamines of Formulae II and III.
8. A modified polyamide 6 prepared by the process as defined in claim 1 and having incorporated therein from 0.05% to 10% by weight of final polymer the polyamine I as defined in claim 1.
9. A modified polyamide 66 prepared by the process as defined in claim 4 and having incorporated therein from 0.05% to 10% by weight of final polymer in admixture with the polyamine I as defined in claim 4, polyamine II, polyamine III or mixtures of polyamines of Formulae II and III.
10. A modified polyamide 66 prepared by the process as defined in claim 1 and having incorporated therein from 0.05% to 10% by weight of final polymer the polyamine I as defined in claim 1.

11. Fibers, filaments and films made from modified polyamide 6 prepared by the process as defined in claim 8.

12. Fibers, filaments and films made from modified polyamide 66 prepared by the process as defined in claim 10.

References Cited

UNITED STATES PATENTS

| | | | |
|---|---|---|---|
| 2,279,745 | 4/1942 | Stevenson | 260—78 |
| 2,615,863 | 10/1952 | Flory | 260—78 |
| 2,985,627 | 5/1961 | Caldwell et al. | 260—78 |
| 2,985,628 | 5/1961 | Caldwell et al. | 260—78 |
| 3,012,994 | 12/1961 | Bell et al. | 260—78 |
| 3,304,289 | 2/1967 | Ballentine et al. | 260—78 |
| 3,352,942 | 11/1967 | Schmitt et al. | 260—78 X |

FOREIGN PATENTS 837,201  3/1970  Canada.

HOWARD E. SCHAIN, Primary Examiner

U.S. Cl. X.R.

260—78 A, 78 L, 563 R, 570.5 P, 570.9